(12) United States Patent
Kramarczyk et al.

(10) Patent No.: US 6,493,319 B1
(45) Date of Patent: Dec. 10, 2002

(54) TEST ACCESS SYSTEM AND METHOD FOR DIGITAL COMMUNICATION NETWORKS

(75) Inventors: Marian Kramarczyk, Suffern, NY (US); David Foni, Englewood, NJ (US); Haim Jacobson, Tenafly, NJ (US); Dobrin Tzotzkov, Ridgefield, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 09/219,269

(22) Filed: Dec. 23, 1998

Related U.S. Application Data

(60) Provisional application No. 60/068,841, filed on Dec. 24, 1997.

(51) Int. Cl.[7] ................................................. H04J 3/14
(52) U.S. Cl. .................. 370/241; 370/419; 370/463; 379/15.01; 379/26.01
(58) Field of Search ................................. 370/241, 242, 370/243, 244, 245, 246, 249, 250, 419, 420, 421, 463; 379/15.01, 15.05, 16, 22, 22.01, 24, 26.01

(56) References Cited

U.S. PATENT DOCUMENTS 4,611,101 A * 9/1986 Walter et al.

(List continued on next page.)

FOREIGN PATENT DOCUMENTS

| DE | 3918144 | 12/1990 | .......... H04Q/3/545 |
|---|---|---|---|
| EP | 317852 A2 | 5/1989 | ............ H04Q/3/58 |
| EP | 383931 A1 | 8/1990 | .......... H04Q/3/545 |
| EP | 687115 A2 A1 | 12/1995 | ............ H04R/1/14 |
| EP | 0 700 193 | 3/1996 | ............ H04M/3/22 |
| GB | 2236398 A | 4/1991 | ............ G01R/31/02 |
| WO | WO 98/03022 | 1/1998 | ............ H04Q/1/14 |

OTHER PUBLICATIONS http://www.adc.com/hadax/news/ds3.htm, XP002100334, "Hadax Electronics DS3 Access System Provides Immediate Problem Determination For DS3 Circuits", *Hadax In The News Press Releases 'Online*, 1 pg. (Apr. 1999).

(List continued on next page.)

*Primary Examiner*—Douglas Olms
*Assistant Examiner*—Shiok Hom
(74) *Attorney, Agent, or Firm*—Fogg & Associates, LLC

(57) ABSTRACT

A system and method for accessing a number of communication lines by one or more testing devices are disclosed. Each of the communications lines is coupled through the system and includes a first termination at a first telecommunications termination site and a second termination at a second telecommunications termination site. The system includes a number of line access devices, each of which is coupled to at least one of the communication lines terminating at the first telecommunications termination site and at least one of the communication lines terminating at the second telecommunications termination site. One or more monitoring busses are defined by a number of relays, one or more of which is coupled to one of the line access devices. A test device interface, which is selectively coupled to the bus, provides bi-directional connectivity between the selected communication line and a selected testing device coupled thereto. An activated one or more of the relays couples a selected one of the communication lines to a selected one of the testing devices via the test device interface. One or more signal paths defined as passing through the relays, test device interface, and a portion of the line access devices define untapped point-to-point connections. The testing access system and method of the present invention accommodates various high speed digital transmission line protocols. The transmission lines coupled through the system may comprise high speed digital transmission lines characterized by transmission rates on the order of tens or hundreds of megabits per second (Mbps).

43 Claims, 11 Drawing Sheets

U.S. PATENT DOCUMENTS

| | | | |
|---|---|---|---|
| 4,663,776 A | * | 5/1987 | Wever et al. |
| 4,815,104 A | | 3/1989 | Williams et al. |
| 4,840,568 A | | 6/1989 | Burroughs et al. |
| 4,901,004 A | | 2/1990 | King |
| 4,916,444 A | | 4/1990 | King |
| 4,968,929 A | | 11/1990 | Hauck et al. |
| 4,989,202 A | * | 1/1991 | Soto et al. |
| 4,998,240 A | * | 3/1991 | Williams |
| 5,052,940 A | | 10/1991 | Bengal |
| 5,107,532 A | | 4/1992 | Hansen et al. |
| 5,161,988 A | | 11/1992 | Krupka |
| 5,166,970 A | | 11/1992 | Ward |
| 5,195,902 A | | 3/1993 | Bengal |
| 5,325,361 A | | 6/1994 | Lederer et al. |
| 5,343,461 A | | 8/1994 | Barton et al. |
| 5,394,503 A | | 2/1995 | Dietz, Jr. et al. |
| 5,432,847 A | | 7/1995 | Hill et al. |
| 5,483,467 A | | 1/1996 | Krupka et al. |
| 5,523,747 A | | 6/1996 | Wise |
| 5,546,282 A | | 8/1996 | Hill et al. |
| 5,594,347 A | | 1/1997 | Louwagie et al. |
| 5,715,474 A | | 2/1998 | Burke et al. |

OTHER PUBLICATIONS

Brochure, Access Systems DS1/DS3, Series 2004/2005, Hadax Electronics, Inc., South Hackensack, NJ (1996).

Brochure, Access Systems DS1, Series 2004, Hadax Electronics, Inc., South Hackensack, NJ (1997).

Brochure, Access Systems DS3, Series 2005, Hadax Electronics, Inc., South Hackensack, NJ (1997).

American National Standard for Telecommunications–Digital Hierarchy–Layer 1 In–Service Digital Transmission Performance Monitoring, American National Standards Institute, Inc., New York, approved Sep. 16, 1993.

"*Network Surveillance Test and Reconfiguration (NetStar)® Remote Test Unit (RTU) User Manual,*" Hardware Description Operation (TL1 Language) Installation Maintenance General Information, ADC Telecommunications, Inc., ADCP–66–301, $2^{nd}$ Edition, Issue 1, Feb. 1991.

* cited by examiner

TEST ACCESS SYSTEM AND METHOD FOR DIGITAL COMMUNICATION NETWORKS

RELATED APPLICATIONS

This application claims the benefit of U.S. Provisional Application No. 60/068,841, filed Dec. 24, 1997.

FIELD OF THE INVENTION

The present invention relates generally to communication line testing systems and, more specifically, relates to a testing system and method which provides for selective connection of testing equipment to any of a plurality of high speed digital communication lines or any other very high frequency digital transmission lines.

BACKGROUND OF THE INVENTION

The term T-1 refers to a telecommunications standard for digital transmission used extensively in the United States. The T-1 standard provides a transmission link with a capacity of 1.544 megabits per second (Mbps) over a twisted wire pair. With this capacity, a T-1 link can handle the equivalent of 24 voice conversations, each digitized at 64 kilobits per second (Kbps). However, with the ever increasing demands that modern technology and the information super highway places upon the communications industry, increasing bandwidth is being demanded. In response to such demand, faster communication links, such as T-3 transmission links, are being deployed to meet these demands. A conventional T-3 link provides the equivalent of 28 T-1 links or a capacity of 44.736 Mbps, which is the equivalent of 672 voice conversations. A T-3 line typically runs on fiber optic, microwave radio, or coaxial cable lines.

The signaling protocol for T-3 systems, commonly referred to as DS-3 signaling, involves pulses which require a bandwidth comparable to VHF (very high frequency) radio waves. At these frequencies, providing switchable access between communication links and test equipment can become problematic, because of the need to ensure signal integrity as the DS-3 pulses propagate through the system. For example, at the circuit level, solid state switching devices are no longer effective to make switchable connections, owing to the high frequency parasitic circuit paths present in such devices. On the printed circuit board level, it becomes necessary for circuit paths to appear substantially as transmission lines, and any failure to do so, can result in substantial mismatches, reflections and other signal distortions, in addition to crosstalk, on the circuit board itself.

SUMMARY OF THE INVENTION

Broadly, it is an object of the present invention to provide a method and apparatus for switching a plurality of testing devices among a plurality of transmission links while preserving the integrity of the signal as it propagates through the system. It is specifically contemplated that all signal paths in the system exhibit the characteristics of a transmission line that provides for no appreciable attenuation or distortion of the signal and no appreciable crosstalk.

In accordance with a preferred embodiment demonstrating objects, features and advantages of the present invention, there is provided a system for providing selective testing access to a plurality of communication signal lines by a plurality of testing devices. The system includes line access cards that provide an interface for plurality of high frequency signal lines and at least one test card that provides an interface for a plurality of high frequency testing devices. The cards plug into a mother board, which provides selective connection between test devices and signal lines.

All high frequency signal paths on the cards and motherboard exhibit the characteristics of a transmission line with a predefined characteristic impedance, and transfer high frequency pulses with minimum attenuation, minimum distortion, and minimum crosstalk. Switching is provided on the motherboard by relays with low insertion loss and crosstalk. The relays are provided on the line access cards, test card, and motherboard. All signal paths represent straight point-to-point electrical circuits with no taps. The connections between the rear cards of the line access devices and the mother board are provided by 96 pin DIN connectors, and represent the only part of the high frequency signal path in which impedance is not strictly controlled. However, the signal integrity through these connectors is maintained by implementing a connector pin assignment and configuration which simulates a co-axial transmission line.

BRIEF DESCRIPTION OF THE DRAWINGS

The foregoing, and other objects, features and advantages of the present invention will be more completely understood from a detailed description of the presently preferred embodiment with reference being had to the accompanying drawings, in which.

DETAILED DESCRIPTION OF THE PREFERRED EMBODIMENT

Figure 1:
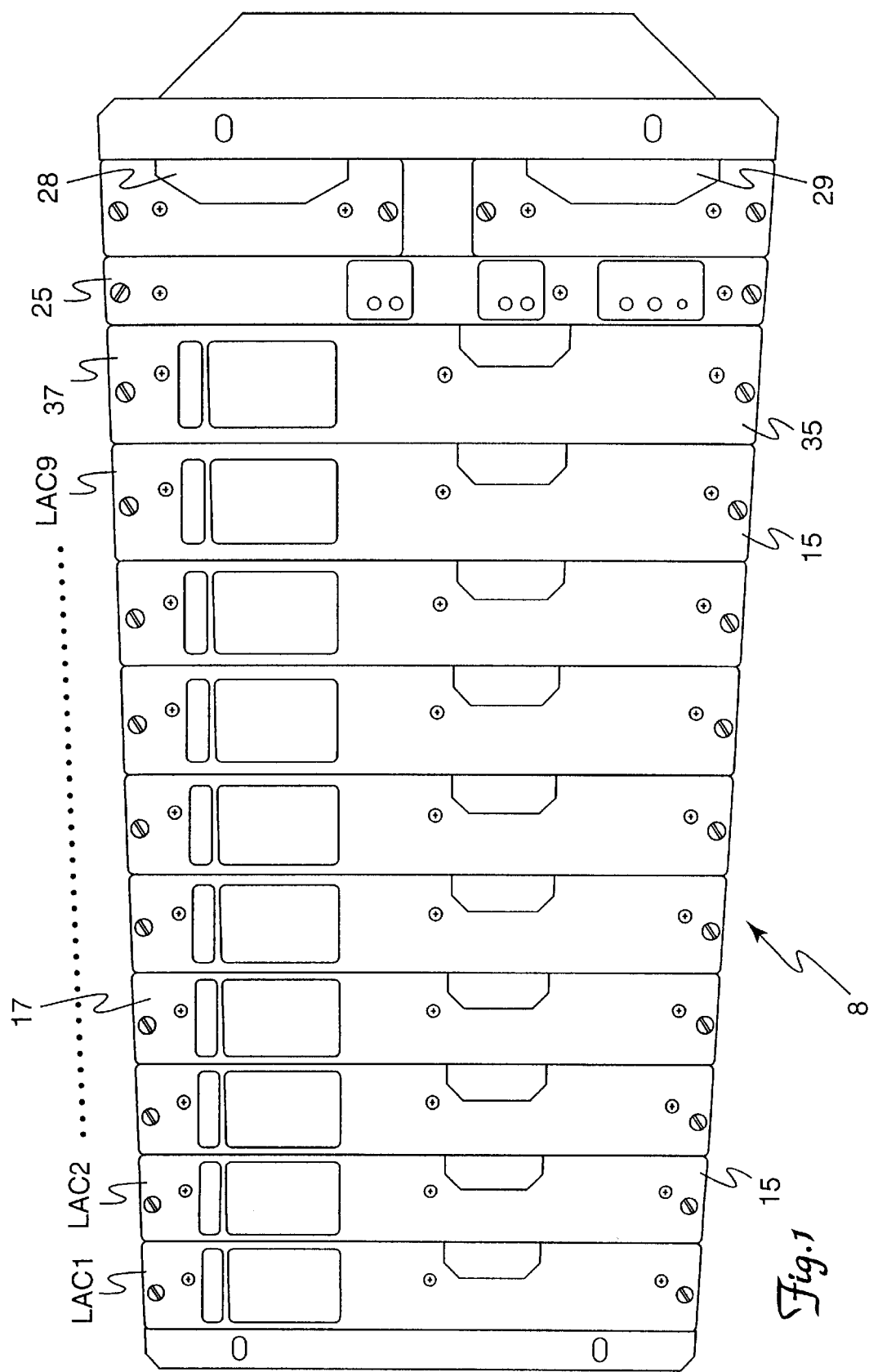
FIG. 1 is a front perspective view of a test access system in accordance with an embodiment of the present invention.
Figure 2:
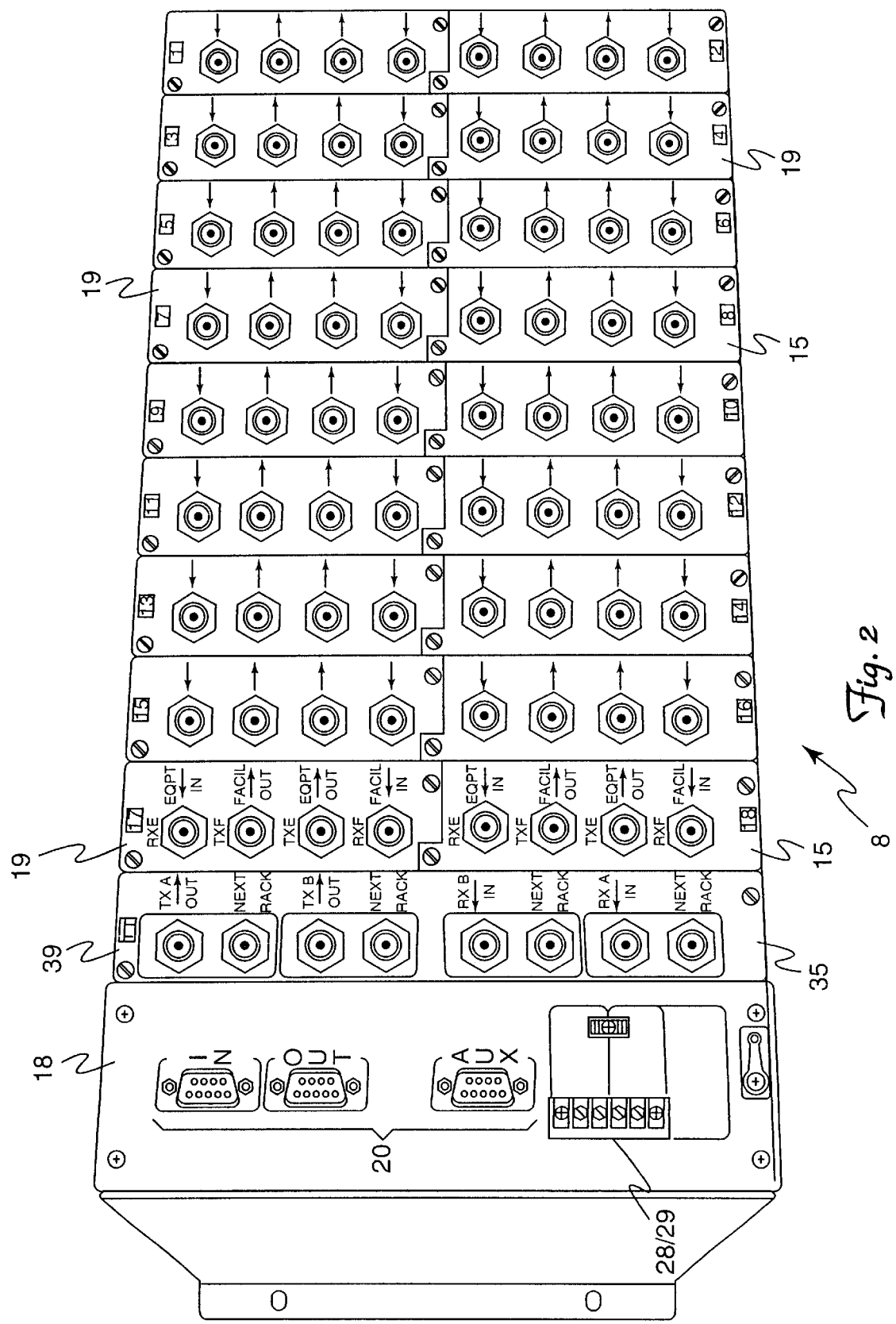
FIG. 2 is a rear perspective view of a test access system in accordance with an embodiment of the present invention.

Turning now to the drawings, FIGS. 1 and 2 are front and rear perspective views, respectively, of a test access system 8 embodying objects and features of the present invention. An embodiment of a. system that operates in accordance with the principles of the present invention is available from ADC-Hadax, Inc. of South Hackensack, N.J. as the "2005 T-3 Access System." Objects and features of the present invention will generally be described herein within the context of a telecommunications network conforming to a T-3 transmission carrier standard, which is used in North America. It is understood that the systems and methods of the present invention are applicable for accessing and testing other types of transmission lines, including high speed digital transmission lines providing transmission rates on the order of tens or hundreds of megabits per second (Mbps).

As is best seen in FIGS. 1 and 2, the test access system 8 includes a number of line access cards 15, a test equipment card 35, a control card 25, and dual power supplies 28, 29. Each of the line access cards 15, as can be seen in FIG. 2, includes a number of connectors for receiving corresponding connectors of a number of communication lines, such as T-3 transmission lines. The test equipment card 35 includes a number of connectors that receive corresponding connectors of a number of testing devices. The control card 25, which includes a programmable processor or CPU, coordinates the activities of the test access system 8, and may further communicate with a remote controlling unit via a communications card 18.

Figure 3:
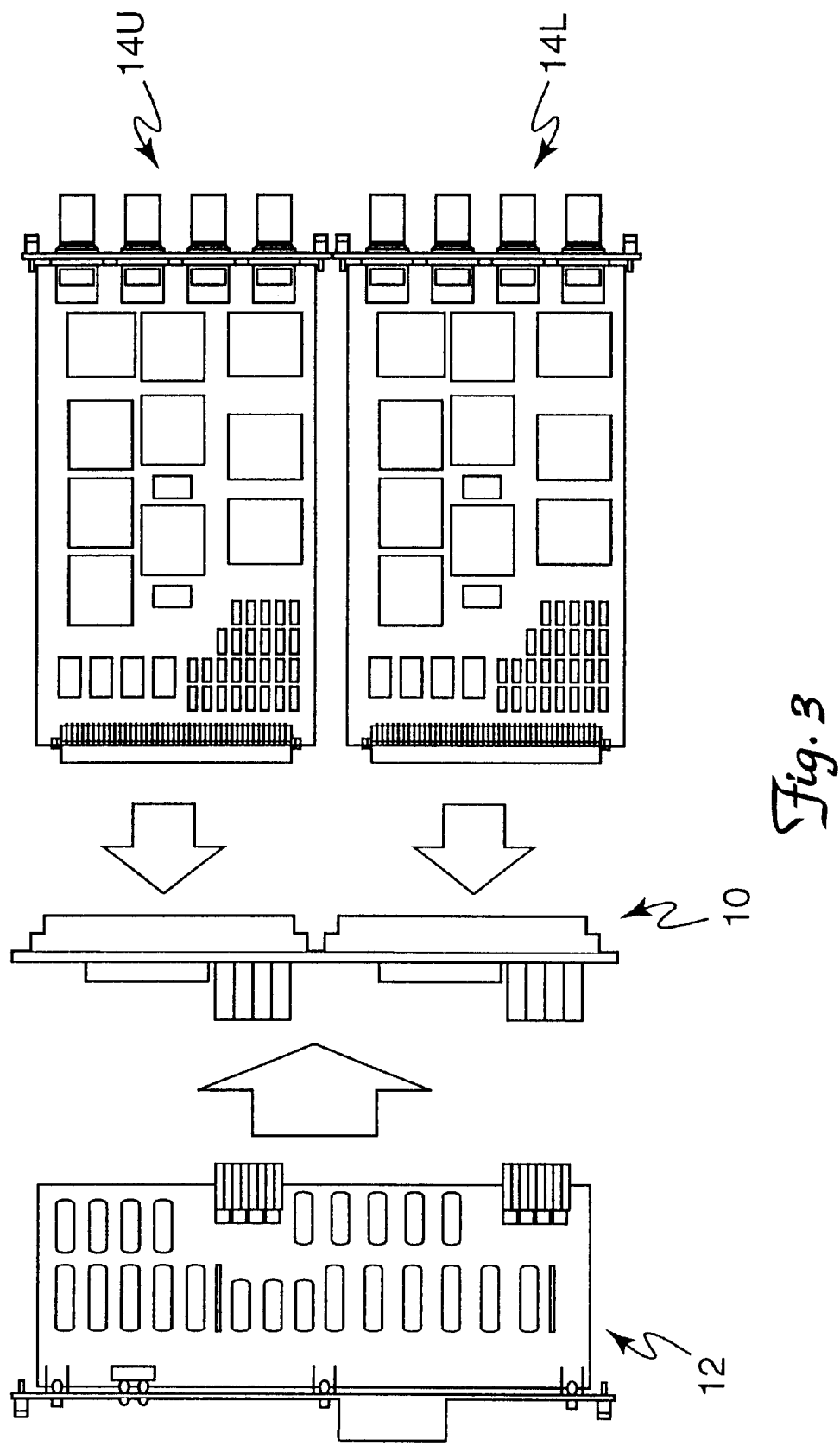
FIG. 3 is a side schematic view of the motherboard illustrating how front and rear cards of a line access module plug thereinto according to an embodiment of the present invention.

In accordance with a preferred embodiment of the present invention, and as is depicted in FIGS. 1 and 2, test access system 8 is designed to be modular and rack mountable. In accordance with this embodiment, test access system 8 includes nine line access cards 15, each of which comprises a front line card (FLC) 17 and a rear line card (RLC) 19. The test equipment card 35, according to this embodiment, comprises a front test card (FTC) 37 and a rear test card (RTC) 39. As is further seen in FIG. 3, the test access system 8 includes a double-sided motherboard 10, with front circuit cards 12 plugging into the front of the motherboard 10 and rear circuit cards 14U, 14L plugging into the rear of the motherboard 10. Rather than a single full-height circuit card, dual half-height circuit cards may be provided, such as a top rear card 14U and a bottom rear card 14L as is illustrated in FIG. 3.

In this configuration, nine front line cards 17 plug into the front of motherboard 10. The rear of the motherboard: 10 provides coupling for a bank of nine top rear line cards 19 (i.e., RLC1–RLC17, odd numbers only) and a bank of nine bottom rear line cards 19 (RLC2–RCL18, even numbers only), for a total of 18 line access cards 15. Also coupled to motherboard 10 is a single test equipment card 35, with the front test card 37 and rear test card 39 of test equipment card 35 being coupled to the front and rear of motherboard 10, respectively. The control card (CC) 25, communications card (COMC) 18, and each of the power supplies 28, 29 are also connected to the motherboard 10.

In operation, four conventional BNC connectors (RXE, RXF, TXE, TXF) provided on each line access card 15, and typically on rear line card 19 of each line access card 15, provide an interface connection for one bi-directional communication line, such as a T-3 transmission line. Similarly, the BNC connectors (TXA, TXB, RXA, RXB) provided on the test equipment card 35, and typically on the rear test card 39 of the test equipment card 35, provide a dual test port, which permits two pieces of communication line test equipment to be connected thereto. The communication card 18 has an interface 20 which includes three connections that provide an RS-232 interface to and from the test access system 8. However, it will be appreciated that any other type of communication interface 20, such as a network interface 20, would work equally well.

In accordance with one embodiment; of the present invention, the front line card 17 of each line access card 15 provides control to a pair of rear line cards 19. In accordance with this embodiment, the front test card 37 of the test equipment card 35 provides control to the rear test card 39. The front line cards 17 and the front test card 37 operate under control of the CPU provided in the control card 25.

Figure 4:
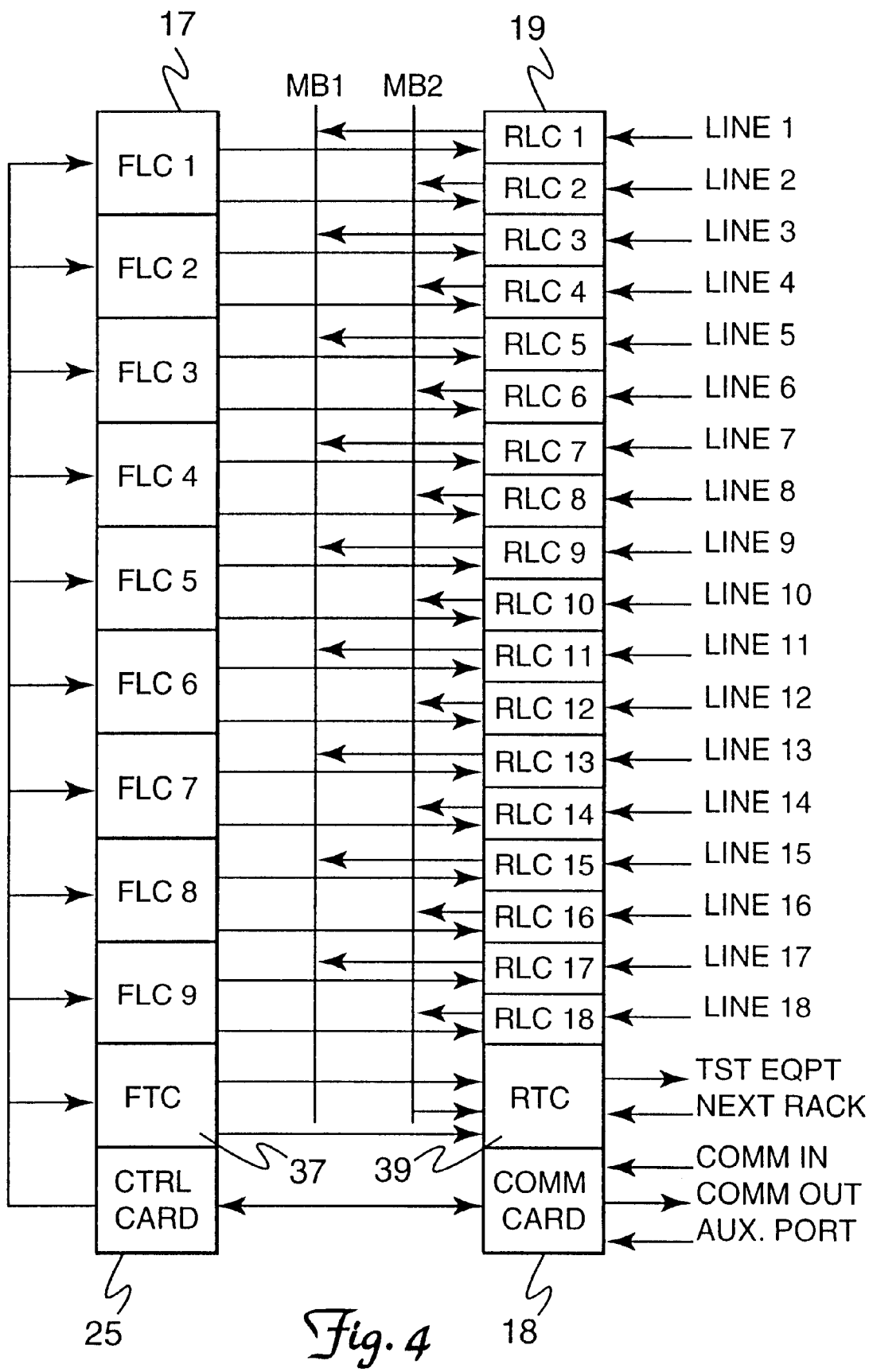
FIG. 4 is a functional block diagram illustrating the operation of a test access system in accordance with an embodiment of the present invention.

The block diagram of FIG. 4 illustrates how the various cards are interconnected through the motherboard 10, and the operation of the test access system 8 will best be understood by reference to that block diagram. A duplex communication line is connected to each of the 18 rear line cards 19 (i.e., RLC1 through RLC18). Two pieces of communication line test equipment are connected to the rear test card 39 (RTC) and are selectively connected to one of the 18 RLCs 19. This is achieved by means of two monitoring buses, MB1 and MB2. The RTC 39 is connected to both of the buses, MB1 and MB2, and each RLC 19 is connected to one of the two busses, MB1, MB2. In the embodiment illustrated in FIG. 4, the odd (upper) RLCs 19 are connected to MB1, and the even (lower) RLCs 19 are connected MB2. The details of making such connections will be discussed further below. At this point it is sufficient to note that the connection between one of the monitoring buses, MB1 or MB2, and an RLC 19 is made through one or more relays.

In accordance with the embodiment shown in FIG. 4, each pair of RLCs 19 which occupy a common slot (i.e., one upper and one lower RLC 19) is controlled by a corresponding front line card 17. The front test card (FTC) 37 of the test equipment card 35 controls the rear test card (RTC) 39. The FLCs 17 and FTC 37 are, in turn, controlled by the CPU provided in the control card (CC) 25. The control card 25 receives configuration commands from a controlling device, such as a terminal or personal computer via an RS-232 link provided through the communication card (COMC) 18. The communication card 18 can also provide outgoing information through one of its communication ports 20, such as status information provided by the control card 25. The use of the communication links makes it particularly efficient to perform remote testing.

An important aspect of a test access system 8 according to the present invention involves ensuring signal integrity as the communication signal pulses propagate through the test access system 8. To ensure a high level of signal transmission integrity, all signal paths within the test access system 8 are designed to exhibit the characteristics of an unbalanced transmission line with a 75 ohm characteristic impedance, capable of transferring communication signal pulses with minimum attenuation, minimum distortion, and minimum crosstalk. However, it will be appreciated that other impedance characteristics will work equally well, where appropriate.

Figure 10:
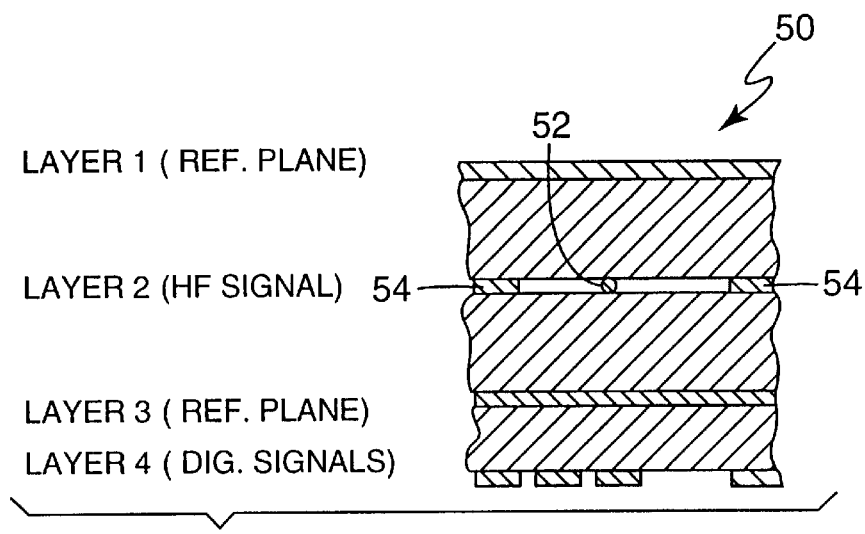
FIG. 10 is a fragmentary sectional view showing a portion of a circuit card as used in the preferred embodiment of the present invention.

In order to provide for such signal transmission integrity at the printed circuit board level, special layout techniques are employed. In accordance with one embodiment of the present invention, the cards of the test access system 8 which are involved in transferring information signals (e.g., the RLCs 19, the RTC 39, and the motherboard 10) are multilayered, impedance controlled printed circuit boards. A circuit board construction according to this embodiment is illustrated in FIG. 10, which shows a section of a circuit board 50 with four layers, layer 1 through layer 4. However, it will be appreciated that a six or greater layer board could be used.

All traces that transfer information signals are designed as unbalanced transmission lines with a 75 ohm characteristic impedance. The transmission lines have a stripline configuration, consisting of a signal conductor and two reference planes, one above and one below the signal conductor. For maximum electromagnetic induction (EMI) shielding, guard conductors are placed on either side of the signal conductors and surround every signal trace. The guard conductors are located on the signal layer of a printed circuit board and are connected to both reference planes at every half inch. Layers 1–3 depicted in FIG. 10 define the stripline configuration, with the high frequency (HF) signal path provided at layer 2 via conductor 52. The guard conductors 54, 54 are also provided in layer 2, on either side of signal conductor 52. Layer 4 is used for the relatively low speed logic (control) signals. The substrate material of the printed circuit board is preferably FR-4.

The components used in the test access system 8 are also selected to have a 75 ohm characteristic impedance and excellent frequency characteristics. Input and output connections for information signal paths are provided by 75 ohm BNC connectors mounted on the printed circuit board. Switching is provided by 75 ohm HF relays with low insertion loss and crosstalk. The connections between the rear cards (RLCs, RTC) 19, 39 and the motherboard 10 are provided by 96 pin DIN connectors. The DIN pin connector interface represents the only part of the information signal path in which impedance is not strictly controlled.

Figure 11:
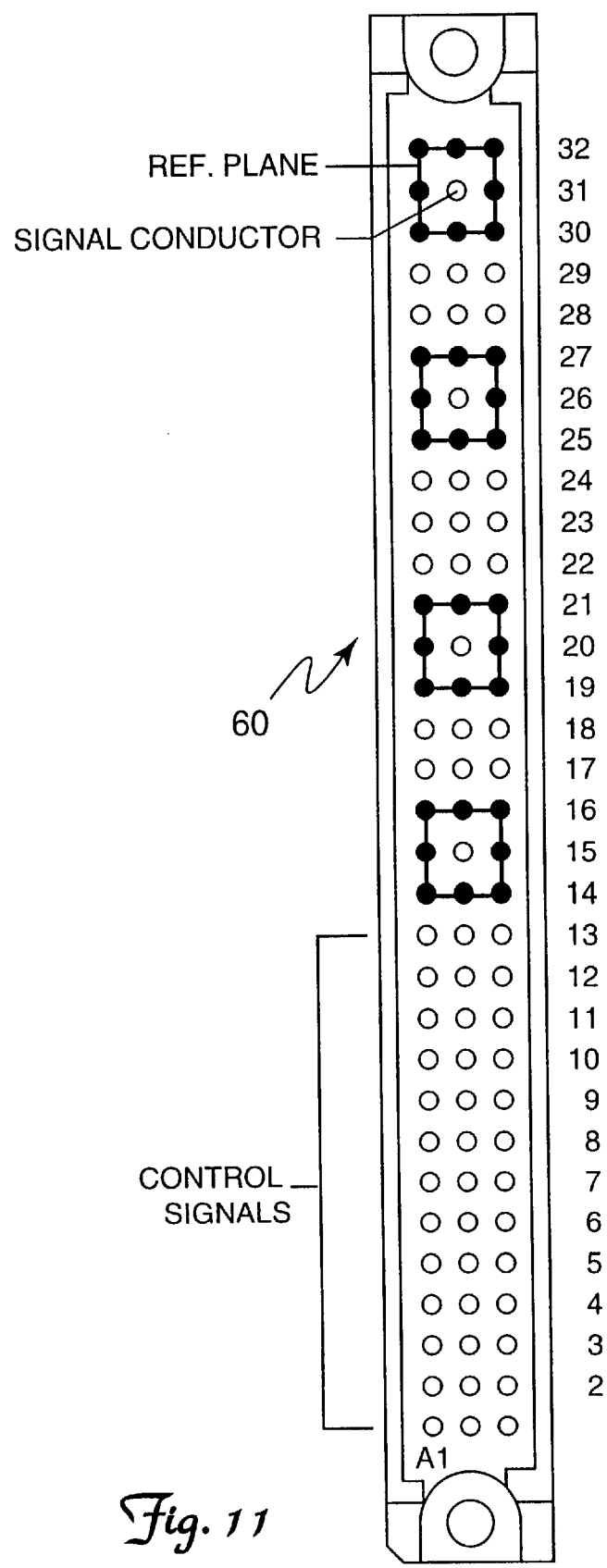
FIG. 11 is a schematic diagram illustrating a 96-pin connector as used in the preferred embodiment of the present invention with a pin arrangement designed to achieve an effective transmission line.

However, signal integrity through these connectors is maintained by using a pin assignment which simulates a co-axial transmission line, thus minimizing the discontinuity and making the connector effectively transparent to the propagating information signal. This pin assignment makes use of one pin from Column B (i.e., middle column of pins) of the connector as a signal conductor and all eight surrounding pins are used as shield conductors. A connector 60 incorporating such a pin configuration is illustrated in FIG. 11, wherein four separate pin groupings are shown. For example, the middle pin in row 31 is shown as connected to the signal conductor. At the same time, the remaining pins in rows 30–32 are connected together and to the ground plane.

From the point of view of the electrical circuit design, all signal paths are straight point-to-point electrical circuits with no taps. All junctions between different signal paths on the RLCs 19 and RTC 39 are made through relay contacts. On the RLCs 19, the "normal through" signal paths are tapped for monitoring through 750 ohm bridging resistors, which virtually eliminate any effect of the tapping circuits on the communication lines in monitoring modes. As was previously discussed, the RLCs 19 are connected to the monitoring busses, MB1 and MB2, through relays which are located on the motherboard 10 and controlled by the FLCs 17.

Figure 5:
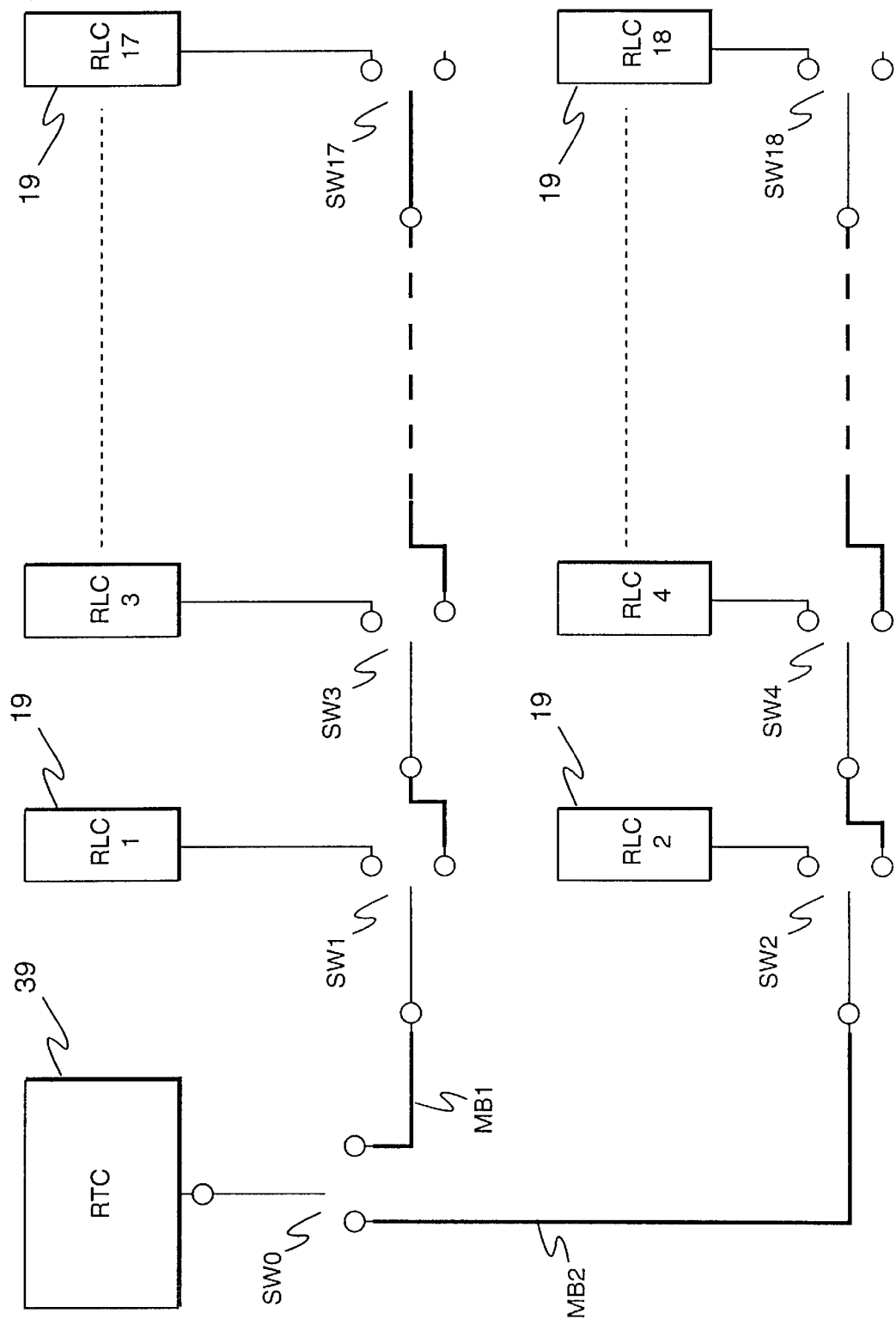
FIG. 5 is a functional block diagram of a test access system illustrating the architecture of the monitoring busses that permit switching access between the rear test card and the rear line card in accordance with an embodiment of the present invention.

FIG. 5 is a schematic block diagram useful in explaining how monitoring bus switching is achieved in a test access system 8 of the present invention so as to ensure signal integrity. FIG. 5 includes components which have already been shown and discussed with respect to FIG. 4, and these components are represented by similar reference characters. FIG. 5 illustrates, in particular, the relays, which are depicted as switches, which achieve monitoring bus switching. The RTC relays, SWO, which are part of the RTC 39 in one embodiment, are capable of connecting the RTC 39 to either MB1 or MB2, depending upon the position of SWO. With respect to the monitoring busses, MB1 and MB2, each RLC 19 includes a corresponding set of relays. By way of example, the upper (odd numbered) RLCs 19 are coupled to associated relay sets SW1–SW17. In each instance, these relays are normally in their downward position (i.e., when not energized).

When no RLC relays are energized, end-to-end continuity of each monitoring bus, MB1, MB2, is provided and no RLCs 19 are connected to the monitoring busses. The relays of the RLCs 19 are, however, activated one at a time, so as to place one of the RLCs 19 on the corresponding monitoring bus. When a set of relays are so energized for a particular RLC 19, the relays are essentially placed in the upward position with respect to the depiction of FIG. 5, which breaks the end-to-end continuity of the corresponding monitoring bus and connects the corresponding RLC 19 to that monitoring bus. The described construction of the motherboard 10 guarantees that, at any time, there is only a single point-to-point connection between the RTC 39 and the selected RLC 19, and no other RLCs 19 are attached to the monitoring bus. At the same time, that part of the monitoring bus which is not in use is disconnected and does not interfere with the propagation of the signal.

Figure 6:
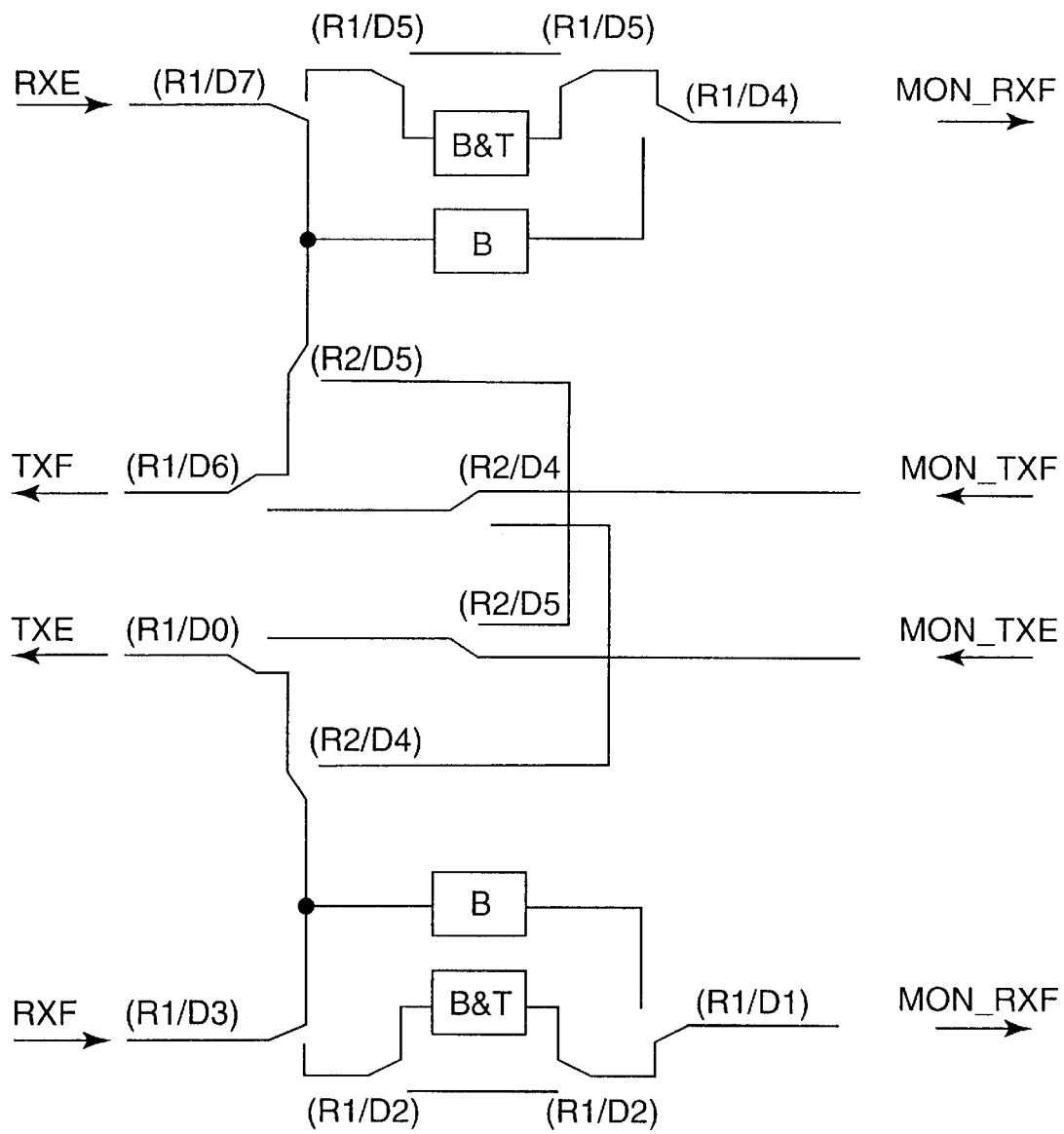
FIG. 6 is a schematic block diagram of a rear line card of a line access module in accordance with an embodiment of the present invention.

FIG. 6 is a schematic block diagram of a rear line card (RLC) 19 in accordance with an embodiment of the present invention. In general, RLC 19 includes two interfaces: one to the communication line and one to the motherboard 10. The interface to the communication line is provided by four BNC connectors. The interface to the motherboard 10 is provided by a 96-pin DIN female connector.

The RLC 19 shown in FIG. 6 includes one dual communication port with two inputs (RXE and RXF) and two outputs (TXE and TXF). RLC 19 also includes a plurality of relays, which are represented as switches in FIG. 6, which are operated under control of the corresponding FLC 17. There are two "normal-through" paths, namely, from RXE to TXF and from RXF to TXE. RLC 19 also provides four paths to a monitoring bus. Two of the paths, from a MON_TXE to TXE and from MON_TXF to TXF, are direct paths. The other two paths are from RXE to MON_RXE and from RXF to MON_RXF and can be direct paths or paths through the B or B&T circuits, depending upon the desired test mode.

Each RLC 19 has the capability of providing loopback connections at the communication port, from RXE to TXE and from RXF to TXF. It should be noted that, in a preferred embodiment, two rear line cards 19 (upper and lower) are used in each slot. This arrangement has the advantage that, in the event that a line card needs to be replaced, only one line needs to be placed temporarily out of service. It will be appreciated that a single line card accommodating two duplex communication lines may also be employed.

Figure 7A:
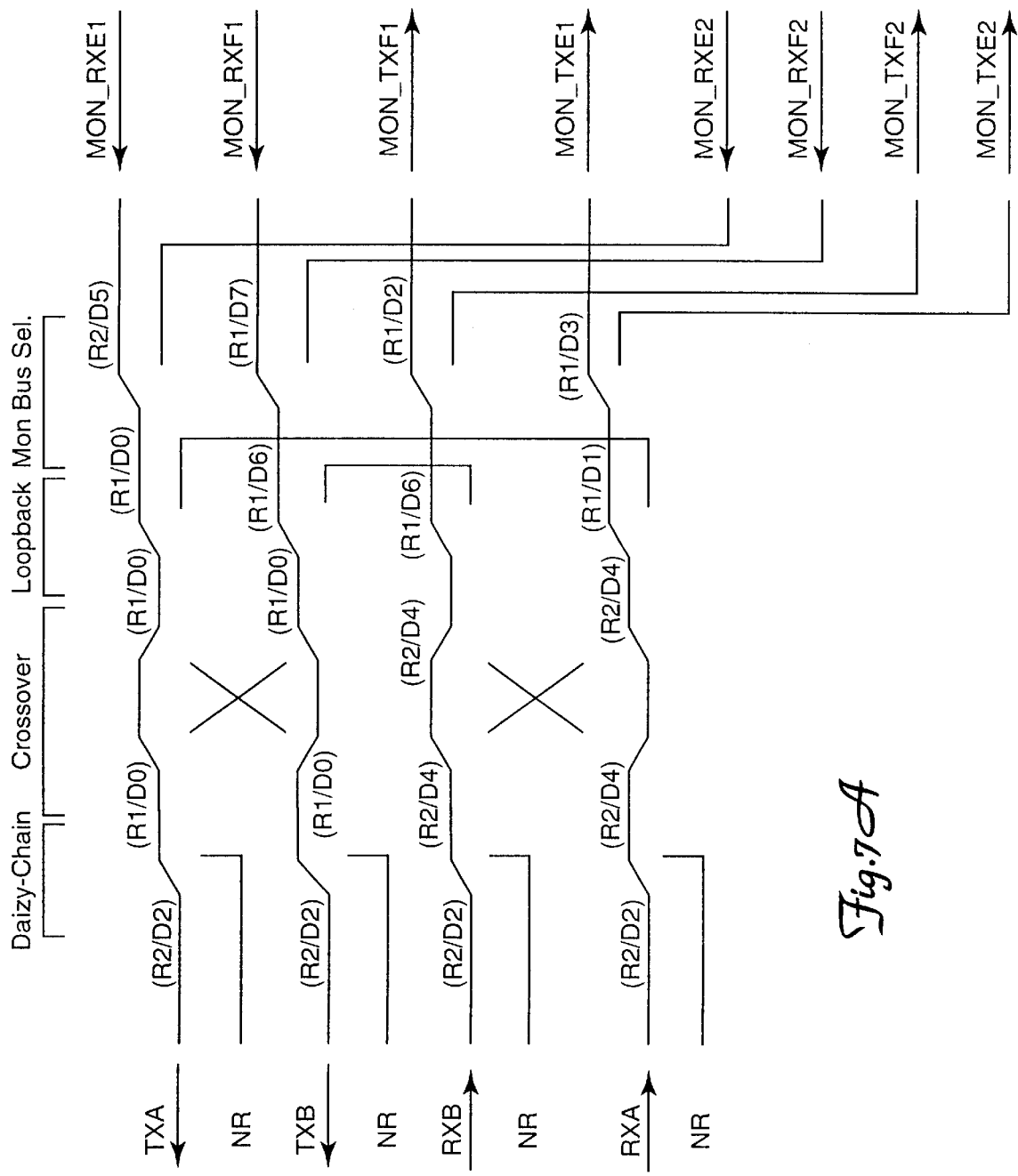
FIG. 7A is a schematic block diagram of a Type-1 rear test card in accordance with an embodiment of the present invention.
Figure 7B:
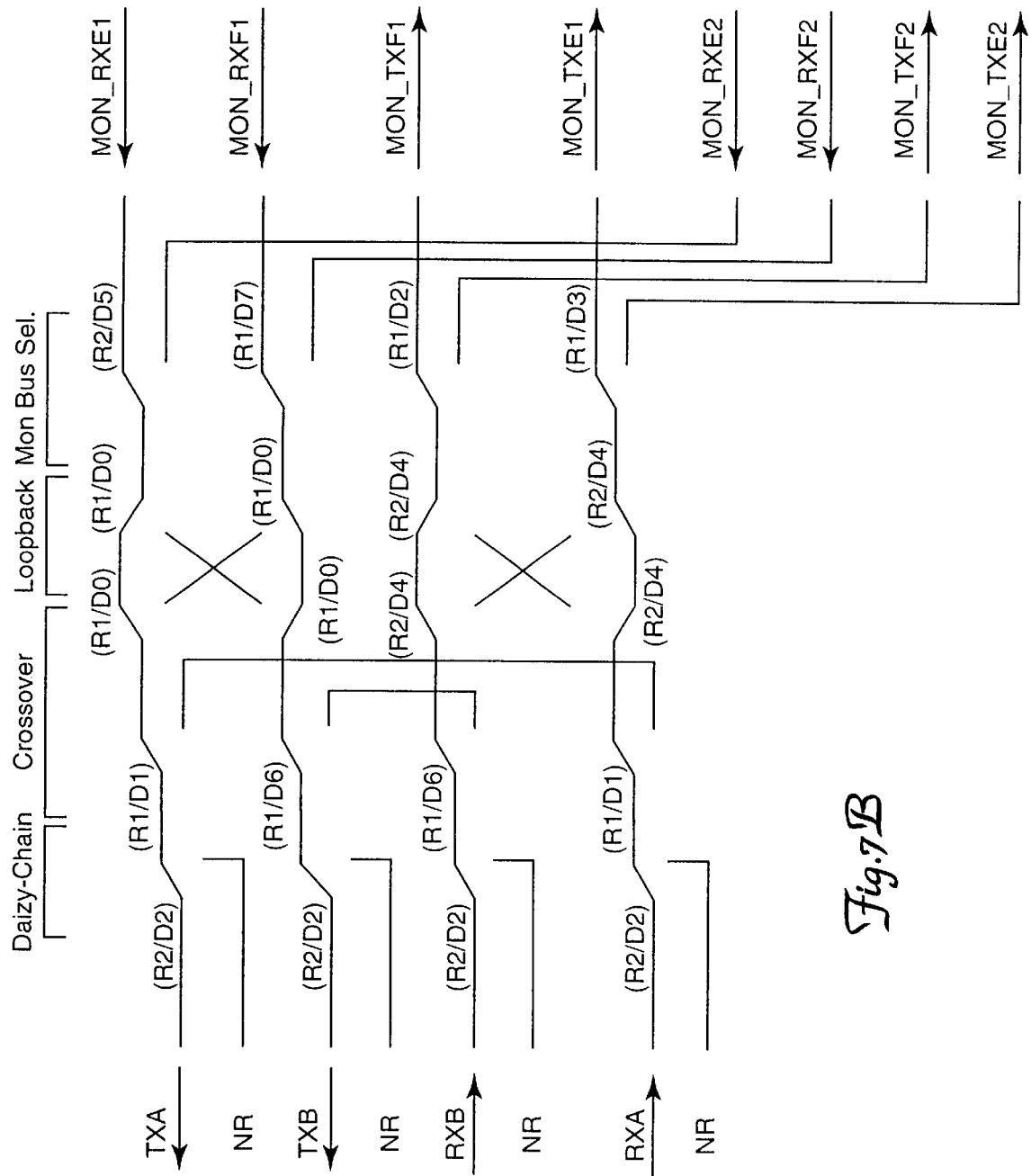
FIG. 7B is a schematic block diagram of a Type 2 rear test card in accordance with an embodiment of the present invention.

The rear test card (RTC) 39 is preferably provided in two types. FIGS. 7A and 7B are schematic block diagrams of a Type 1 RTC and a Type 2 RTC, respectively. Both RTC types includes one dual test port with two inputs (RXA and RXB) and two outputs (TXA and TXB). Each RTC 39 also includes a plurality of relays, depicted as switches, which are operated under control of a front test card (FTC) 37. The Type 1 RTC 39, shown in FIG. 7A, can provide loopback for many of the inputs to any of the outputs. The Type 2 RTC 39, shown in FIG. 7B, can provide loopback from RXA to TXA and from RXB to TXB only. On the other hand, RTC Type 1 cannot provide loopback at the unused port when A Split, AX Split, B Split and BX Split modes are selected.

Four connectors labeled NR in FIGS. 7A and 7B provide connection to the next rack mount in "daisy-chain" configurations. Depending on the position of the "daisy-chain" contacts shown in FIGS. 7A & 7B, the test port can be connected either to one of the monitoring buses of the present rack mount or the next rack mount. The "crossover" contacts provide direct or cross connections for the inputs (RXA, RXB) and for the outputs (TXA, TXB). The "loopback" contacts provide loopback connections from RXA to TXA and from RXB to TXB. The "MON Bus Select" contacts provide connections to either of the two monitoring buses, MB1, MB2.

RTC 39 includes three interfaces: one to the communication line test equipment; one to the next rack mount; and one to the motherboard 10. The interface to the communication line test equipment is provided by four BNC connectors, such as RXA, TXA, RXB and TXB shown in FIG. 2. The interface to the next rack mount is provided by four BNC connectors labeled "next rack," which is also shown in FIG. 2. The interface to the motherboard 10 is provided by one 96 pin DIN female connector.

Figure 8:
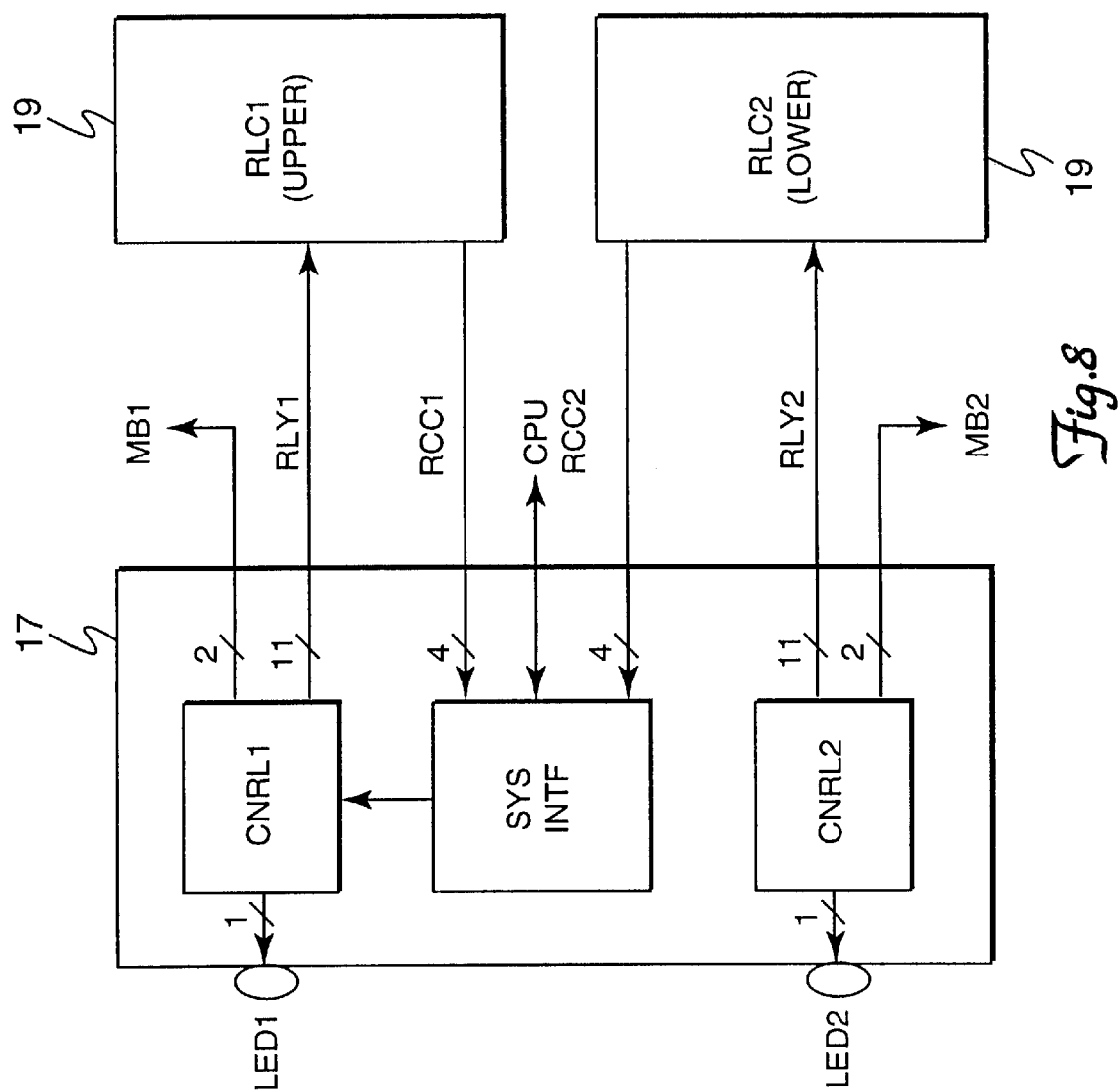
FIG. 8 is a functional block diagram illustrating the operation of a front line card of a line access module in accordance with an embodiment of the present invention.

FIG. 8 is a functional block diagram illustrating the operation of a front line card (FLC) 17 in accordance with an embodiment of the present invention. For purposes of illustration, and not of limitation, an FLC 17 is shown coupled to a pair of rear line cards 19, RLC1 and RLC2, each of which is controlled by FLC 17. FLC 17, in turn, is controlled by a CPU provided in control card 25. FLC 17 includes two control blocks (CTRL1 and CTRL2), each of which provides control to a respective RLC 19 (RLC1 and RCL2, respectively).

FLC 17 further includes a set of relays for defining part of a respective monitoring bus MB1, MB2. Two light emitting diodes (LED1 and LED2) provided on the front of FLC 17 indicate the status of the corresponding RLCs 19. By way of example, when a respective RLC 19 is in a test mode, the corresponding LED is illuminated, whereas when a loopback mode is selected, the corresponding LED blinks. In addition to relay drivers, control blocks CTRL1 and CTRL2 also includes two 8-bit control registers. Registers 1 and 2 are provided in CTRL1 for RCL1, and Registers 3 and 4 are provided in CTRL2 for RLC2.

The bits in the odd register (Register 1 and Register 3) have the following effect on the relays of the corresponding RLC 19 in accordance with an embodiment of the present invention:

D7: when 0, closes "normal through" path from RXE to TXF. when 1, connects RXE to monitoring bus.

D6: when 0, closes "normal through" path from RXE to TXF. when 1, connects TXF to monitoring bus.

D5: when 0, selects B & T circuit. when 1, selects direct connection from RXE to monitoring bus.

D4: when 0, selects split mode. when 1, selects monitoring mode.

D3: when 0, closes "normal through" path from RXF to TXE. when 1, connects RXF to monitoring bus.

D2: when 0, select B & T circuit. when 1, selects direct connection from RXF to monitoring bus.

D1: when 0, selects split mode. when 1, selects monitoring mode.

D0: when 0, closes "normal through" path from RXF to TXE. when 1, connects TXE to monitoring bus.

Similarly, the even control register (Registers 2 and 4) have eight bits which have the following effect on the relays of the corresponding RLC 19 in accordance with an embodiment of the present invention:

D7: when 0, disconnects MON_RXE and MON_TXF from the RLC. when 1, connects MON_RXE and MON_TXF to the RLC.

D6: when 0, disconnects MON_RXF and MON_TXE from the RLC. when 1, connects MON_RXF and MON_TXE from the RLC.

D5: when 0, de-selects loopback from RXE to TXE. when 1, selects loopback from RXE to TXE.

D4: when 0, selects loopback from RXF to RXF. when 1, de-selects loopback from RXF to TXF.

D3: when 0, disconnects the shield of RXE-TXF switching circuit to the shield of the monitoring bus. when 1, connects the shield of RXE-TXF switching circuit to the shield of the monitoring bus.

D2: when 0, disconnects the shield of RXF-TXE switching circuit to the shield of the monitoring bus. when 1, connects the shield of RXF-TXE switching circuit to the shield of the monitoring bus.

D1: when 0, disconnects the shield of RXE-TXF switching circuit to the shield of the RXF-TXE switching circuit. when 1, connects the shield of RXE-TXF switching circuit to the shield of the RXF-TXE switching circuit.

D0: when 0, turns off the LED for the corresponding RLC. when 1, illuminates the LED for the corresponding RLC.

It will be appreciated that the control registers CNRL1 and CNRL2 of RLC 19 allow a large number of different modes of operation by virtue of the different 8 bit words that can be provided in each register. Table 1 provided below exemplifies a number of different modes of operation that may be available for each RLC 19. The described modes correspond to various test modes defined by the Bellcore standards for testing communication equipment.

TABLE 1

| Mode | Control Registers 1 (3) (R1, R3) | | | | | | | | Control Register 2 (4) (R2, R4) | | | | | | | |
|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 |
| E (X) Monitor | X | 0 | 0 | 0 | X | 0 | 0 | 0 | 1 | 0 | 0 | 0 | 1 | 0 | 0 | 1 |
| F (X) Monitor | X | 0 | 0 | 0 | X | 0 | 0 | 0 | 0 | 1 | 0 | 0 | 0 | 1 | 0 | 1 |
| EF (X) Monitor | X | 0 | 0 | 0 | X | 0 | 0 | 0 | 1 | 1 | 0 | 0 | 1 | 1 | 0 | 1 |
| E (X) Split (F Loop) | X | 1 | 0 | 0 | X | 0 | 0 | 1 | 1 | 1 | 0 | 0 | 1 | 1 | 1 | 1 |
| | (1) | | | | | | | | (1) | | | | | | | |

TABLE 1-continued

| Mode | Control Registers 1 (3) (R1, R3) | | | | | | | | Control Register 2 (4) (R2, R4) | | | | | | | |
|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 |
| E (X) Split w B & t (F Loop) | X | 1 | 1 | 0 (1) | X | 0 | 0 | 1 | 1 | 1 | 0 | 0 (1) | 1 | 1 | 1 | 1 |
| F (X) Split (E Loop) | X | 0 | 0 | 1 | X | 1 | 0 | 0 (1) | 1 | 1 | 0 (1) | 0 | 1 | 1 | 1 | 1 |
| F (X) Split w B & T (E Loop) | X | 0 | 0 | 1 | X | 1 | 1 | 0 (1) | 1 | 1 | 0 (1) | 0 | 1 | 1 | 1 | 1 |
| EF (X) Split | X | 1 | 0 | 1 | X | 1 | 0 | 1 | 1 | 1 | 0 | 0 | 1 | 1 | 1 | 1 |
| EF (X) Split w B & T | X | 1 | 1 | 1 | X | 1 | 1 | 1 | 1 | 1 | 0 | 0 | 1 | 1 | 1 | 1 |
| A (X) Split | X | 1 | 0 | 1 | X | 0 | 0 | 0 | 1 | 0 | 0 | 0 | 1 | 0 | 0 | 1 |
| A (X) Split w B & T | X | 1 | 1 | 1 | X | 0 | 0 | 0 | 1 | 0 | 0 | 0 | 1 | 0 | 0 | 1 |
| B (X) Split | X | 0 | 0 | 0 | X | 1 | 0 | 1 | 0 | 1 | 0 | 0 | 0 | 1 | 0 | 1 |
| B (X) Split w B & T | X | 0 | 0 | 0 | X | 1 | 1 | 1 | 0 | 1 | 0 | 0 | 0 | 1 | 0 | 1 |
| AB (X) Split | X | 1 | 0 | 1 | X | 1 | 0 | 1 | 1 | 1 | 0 | 0 | 1 | 1 | 1 | 1 |
| AB (X) Split w B & T | X | 1 | 1 | 1 | X | 1 | 1 | 1 | 1 | 1 | 0 | 0 | 1 | 1 | 1 | 1 |
| E Loop | X | 0 | 0 | 0 | X | 0 | 0 | 1 | 0 | 0 | 1 | 0 | 0 | 0 | 1 | BL |
| F Loop | X | 0 | 0 | 1 | X | 0 | 0 | 0 | 0 | 0 | 0 | 1 | 0 | 0 | 1 | BL |
| EF Loop | X | 0 | 0 | 1 | X | 0 | 0 | 1 | 0 | 0 | 1 | 1 | 0 | 0 | 1 | BL |
| DS1 Drop & Insert A* | X | 1 | 1 | 1 | X | 0 | 0 | 0 | 1 | 1 | 0 | 0 | 1 | 1 | 1 | 1 |
| DS1 Drop & Insert B* | X | 0 | 0 | 0 | X | 1 | 1 | 1 | 1 | 1 | 0 | 0 | 1 | 1 | 1 | 1 |

Figure 9:
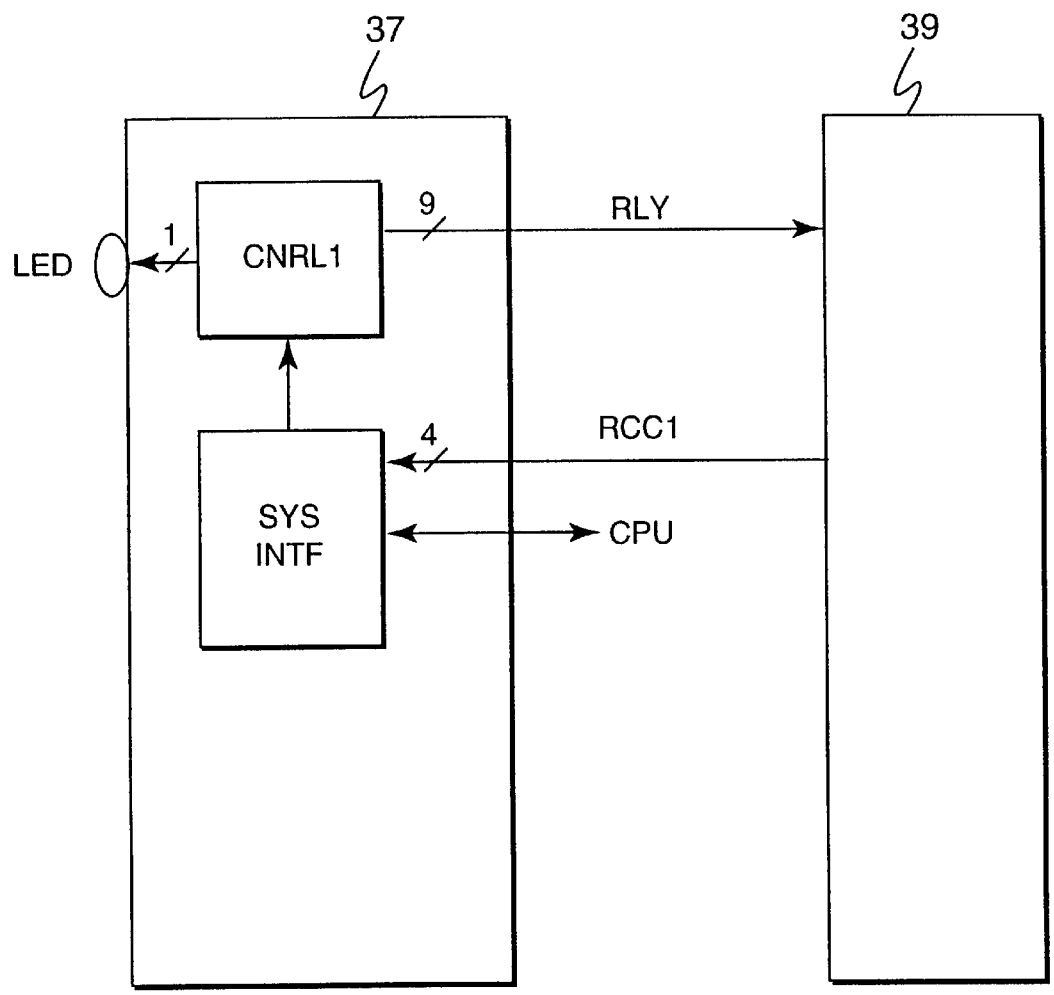
FIG. 9 is a schematic block diagram illustrating the operation of a front test card of a test card module in accordance, with an embodiment of the present invention.

FIG. 9 is a schematic block diagram illustrating the operation of a front test card (FTC) 37 in accordance with an embodiment of the present invention. FTC 37 controls the relays in the rear test card (RTC) 39 and is itself controlled by the CPU provided in the control card 25. FTC 37 includes a single control block (CTRL1) which provides control to the RTC 39. One light emitting diode (LED) on the front of FTC 37 indicates the status of the RTC 39. When RTC 39 is in a test mode, the LED is illuminated, whereas when RTC 39 is in a loopback mode, the LED blinks. FTC 37 contains relay drivers for RTC 39 and two 8-bit control registers.

The bits of control Register 1 of CTRL1 in FTC 37 have the following effect on the relays of RTC 39 in accordance with an embodiment of the present invention:

D7: when 0, selects MON_RXB line from the upper monitoring bus (MB1). when 1, selects MON RXB line from the lower monitoring bus (MB2).

D6: when 0, de-selects loopback between RXB-TXB (if crossover is not active). when 1, selects loopback between RXB-TXB (if crossover is not active).

D5: not used.

D4: not used.

D3: when 0, selects MON_TXA line from the upper monitoring bus (MB1). when 1, selects MON_TXA line from the lower monitoring bus (MB2).

D2: when 0, selects MON_TXB line from the upper monitoring bus (MB1). when 1, selects MON_TXB line from the lower monitoring bus (MB2).

D1: when 0, de-selects loopback between RXA-TXA (if crossover is not active). when 1, selects loopback between RXA-TXA (if crossover is not active).

D0: when 0, selects direct connections to TXA and TXB (crossover). when 1, selects cross-connections to TXA and TXB (crossover).

The bits of control Register 2 of CNRL1 in FTC 37 have the following effect on the relays of the RTC 39 in accordance with an embodiment of the present invention:

D7: not used.

D6: not used.

D5: when 0. selects MON_RXA line from the upper monitoring bus (MB1). when 1, selects MON RXA line from the lower monitoring bus (MB2).

D4: when 0, selects direct connections to RXA and RXB (crossover). when 0, selects cross-connections to RXA and RXB (crossover).

D3: not used.

D2: when 0, selects local Rack. when 1, selects Next Rack.

D1: not used.

D0: when 0, turns off the test LED. when 1, illuminates the test LED.

It will therefore be appreciated that the different combinations of bits available in the two control Registers of CNRLL in FTC 37 will produce a large number of operating modes in RTC 39. Table 2 provided below exemplifies various operating modes available for RTC 39 in accordance with an embodiment of the present invention.

TABLE 2

| Mode | Control Registers 1 (R1) | | | | | | | | Control Register 2 (R2) | | | | | | | |
|---|---|---|---|---|---|---|---|---|---|---|---|---|---|---|---|---|
| | D7 | D6 | D5 | D4 | D3 | D2 | D1 | D0 | D7 | D6 | D5 | D4 | D3 | D2 | D1 | D0 |
| E Monitor (B Loop) | A | 0 (1) | X | X | A | A | 0 | 0 | X | X | A | 0 | X | 0 | X | 1 |
| EX Monitor (A Loop) | A | 0 (1) | X | X | A | A | 0 | 1 | X | X | A | 0 (1) | X | 0 | X | 1 |

TABLE 2-continued

| | Control Registers 1 (R1) | | | | | | | | Control Register 2 (R2) | | | | | | | |
|---|---|---|---|---|---|---|---|---|---|---|---|---|---|---|---|---|
| Mode | D7 | D6 | D5 | D4 | D3 | D2 | D1 | D0 | D7 | D6 | D5 | D4 | D3 | D2 | D1 | D0 |
| F Monitor (A Loop) | A | 0 | X | X | A | A | 0 (1) | 0 | X | X | A | 0 | X | 0 | X | 1 |
| FX Monitor (B Loop) | A | 0 | X | X | A | A | 0 (1) | 1 | X | X | A | 0 (1) | X | 0 | X | 1 |
| EF Monitor | A | 0 | X | X | A | A | 0 | 0 | X | X | A | 0 | X | 0 | X | 1 |
| EFX Monitor | A | 0 | X | X | A | A | 0 | 1 | X | X | A | 0 | X | 0 | X | 1 |
| E Split (B Loop) | A | 0 (1) | X | X | A | A | 0 | 0 | X | X | A | 0 | X | 0 | X | 1 |
| EX Split (A Loop) | A | 0 (1) | X | X | A | A | 0 | 1 | X | X | A | 1 | X | 0 | X | 1 |
| F Split (A Loop) | A | 0 | X | X | A | A | 0 (1) | 0 | X | X | A | 0 | X | 0 | X | 1 |
| FX Split (B Loop) | A | 0 | X | X | A | A | 0 (1) | 1 | X | X | A | 1 | X | 0 | X | 1 |
| EF Split | A | 0 | X | X | A | A | 0 | 0 | X | X | A | 0 | X | 0 | X | 1 |
| EFX Split | A | 0 | X | X | A | A | 0 | 1 | X | X | A | 1 | X | 0 | X | 1 |
| A Split | A | 0 | X | X | A | A | 0 | 0 | X | X | A | 1 | X | 0 | X | 1 |
| AX Split | A | 0 | X | X | A | A | 0 | 1 | X | X | A | 0 | X | 0 | X | 1 |
| B Split | A | 0 | X | X | A | A | 0 | 0 | X | X | A | 1 | X | 0 | X | 1 |
| BX Split | A | 0 | X | X | A | A | 0 | 1 | X | X | A | 0 | X | 0 | X | 1 |
| AB Split | A | 0 | X | X | A | A | 0 | 0 | X | X | A | 1 | X | 0 | X | 1 |
| ABX Split | A | 0 | X | X | A | A | 0 | 1 | X | X | A | 0 | X | 0 | X | 1 |
| A Loop | X | 0 | X | X | X | X | 1 | 0 | X | X | X | 0 | X | 0 | X | BL |
| B Loop | X | 1 | X | X | X | X | 0 | 0 | X | X | X | 0 | X | 0 | X | BL |
| AB Loop | X | 1 | X | X | X | X | 1 | 0 | X | X | X | 0 | X | 0 | X | BL |
| Primary Loop* | X | 0 | X | X | X | X | 1 | 0 | X | X | X | 0 | X | 0 | X | BL |
| Secondary Loop* | X | 1 | X | X | X | X | 0 | 0 | X | X | X | 1 | X | 0 | X | BL |
| DS1 Drop & Insert A* | A | 0 | X | X | A | A | 0 | 1 | X | X | A | 1 | X | 0 | X | 1 |
| DS1 Drop & Insert B* | A | 0 | X | X | A | A | 0 | 0 | X | X | A | 0 | X | 0 | X | 1 |
| Next Rack | X | X | X | X | X | X | X | X | X | X | X | X | X | 1 | X | 1 |

Although a preferred system and method embodying the present invention have been disclosed for illustrative purposes, those skilled in the art will appreciate that many additions, modifications and substitutions are possible without departing from the scope of the present invention. For example, a system has been described for providing testing access to T-3 communication links. It is contemplated that the present invention may be utilized for substantially higher frequency signals, such as DS-5 signals which, in Europe, provide a capacity of 565.148 Mbps. All such variations are intended to be within the scope of the invention as provided in the appended claims.

What is claims is:

1. A system for accessing a plurality of communication lines by one or more testing devices, each of the plurality of communications lines coupled through the system and having a first termination at a first telecommunications termination site and a second termination at a second telecommunications termination site, the system comprising:
    a plurality of line access devices, each of the line access devices coupled to at least one of the communication lines terminating at the first telecommunications termination site and at least one of the communication lines terminating at the second telecommunications termination site in the system having a plurality of operational modes;
    a plurality of relays defining a bus, one or more of the relays coupled to one of the line access devices; and
    a test device interface coupled to the bus, an activated one or more of the relays coupling a selected one of the communication lines to a selected one of the testing devices via the test device interface.

2. The system of claim 1, wherein the test device interface provides bi-directional connectivity between the selected communication line and a selected testing device.

3. The system of claim 1, wherein one or more signal paths defined as passing through the relays, test device interface, and a portion of the line access devices define untapped point-to-point connections.

4. The system of claim 1, wherein one or more signal paths defined as passing through the line access devices, relays, and test device interface define high frequency signal paths.

5. The system of claim 1, wherein the communication lines comprise high speed digital transmission lines.

6. The system of claim 1, wherein the communication lines comprise high speed digital transmission lines characterized by transmission rates on the order of tens or hundreds of megabits per second (Mbps).

7. The system of claim 1, further comprising a chassis, wherein each of the line access devices and the test device interface are removably insertable into one of a plurality of slots provided in the chassis.

8. The system of claim 7, further comprising a control device and a communications device, wherein each of the control device and communications device is removably insertable into one of the plurality of slots provided in the chassis.

9. The system of claim 7, wherein the chassis is removably mountable to an equipment rack.

10. The system of claim 1, wherein each of the test device interfaces comprises one or more visual indicators for communicating operating status information.

11. The system of claim 1, wherein the test device interface comprises a test card, the test card comprising one or more visual indicators for communicating an operating status of the test device interface.

12. The system of claim 1, wherein the test device interface comprises a front test card and a rear test card, the front test card comprising one or more visual indicators for communicating an operating status of the test device interface.

13. The system of claim 1, wherein each of the line access devices comprises one or more visual indicators for communicating operating status information.

14. The system of claim 1, wherein each of the line access devices comprises a line card, each of the line cards comprising one or more visual indicators for communicating operating status information.

15. The system of claim 1, wherein each of the line access devices comprises a rear line card coupled to at least one of the communication lines and a front line card, the front line cards providing control to corresponding rear line cards and comprising one or more visual indicators for communicating operating status information.

16. The system of claim 1, wherein each of the line access devices comprises a pair of rear line cards each coupled to at least one of the communication lines and a front line card, the front line card providing control to each of the rear line cards.

17. The system of claim 1, wherein each of the line access devices comprises a plurality of input/output connectors.

18. The system of claim 17, wherein the input/output connectors comprise BNC connectors.

19. The system of claim 1, wherein the system is operative in a digital signal cross-connect (DSX) environment.

20. A system for providing access to a plurality of communication lines by one or more testing devices, comprising:
  a plurality of line access devices, each of the line access devices coupled to at least one of the communication lines in the system having a plurality of operational modes;
  a test device interface;
  a plurality of relays defining a bus, an activated one or more of the relays coupling a selected one of the communication lines to a selected one of the testing devices via the test device interface;
  a control device coupled to, and controlling, the line access devices and the test device interface; and
  a communications device coupled to the control device, the communications device providing remote access to the system by a remote controlling device.

21. The system of claim 20, wherein the communications device provides communication of information between the system and the remote controlling device.

22. The system of claim 20, wherein the communications device provides communication of configuration or status information between the system and the remote controlling device.

23. The system of claim 20, wherein the remote controlling device comprises a computer or a terminal.

24. The system of claim 20, wherein the communications device provides communication of information between the system and the remote controlling device for testing the communication lines.

25. A system for providing access to a plurality of communication lines by one or more testing devices; comprising:
  a plurality of line access devices, each of the line access devices coupled to at least one of the communication lines;
  a test device interface;
  a motherboard; and
  a plurality of relays defining a bus and provided on the motherboard, an activated one or more of the relays coupling a selected one of the communication lines to a selected one of the testing devices via the test device interface through signal paths, each signal path having a stripline configuration and passing on or in a printed circuit board having multiple layers, the relays, test device interface, and a portion of the line access devices exhibiting characteristics of an unbalanced transmission line having a characteristic impedance approximately equivalent to an impedance of the selected communication line.

26. The system of claim 25, wherein one or more signal paths defined as passing through the relays, test device interface, and the portion of the line access devices define untapped point-to-point connections.

27. The system of claim 25, wherein the characteristic impedance is approximately 75 ohm.

28. The system of claim 25, wherein one or more signal paths defined as passing through the relays, test device interface, and the portion of the line access devices have a stripline configuration.

29. The system of claim 25, wherein one or more signal paths defined as passing through the relays, test device interface, and the portion of the line access devices comprise a signal conductor disposed between a plurality of reference planes.

30. The system of claim 29, further comprising first and second guard conductors respectively disposed on opposite sides of each of the signal conductors, the guard conductors coupled to the reference planes at predetermined locations and providing electromagnetic induction (EMI) shielding.

31. The system of claim 25, wherein the relays define a plurality of bus lines, further wherein some of the line access devices are coupled to a first bus line of the plurality of bus lines and some of the line access devices are coupled to a second bus line of the plurality of bus lines.

32. The system of claim 25, further comprising a multiple conductor connector, providing coupling between the motherboard and each of the line access devices, a pin configuration of the multiple conductor connector providing an effective impedance representative of a co-axial transmission line.

33. The system of claim 32, wherein pins of the connector are configured to include a signal conductor pin about which a plurality of shield conductor pins are situated.

34. The system of claim 32, wherein the connector comprises a DIN connector.

35. The system of claim 25, wherein the system is selectively operative in a test mode and a loopback mode.

36. The system of claim 25, wherein the communication lines comprise high speed digital transmission lines.

37. The system of claim 25, wherein the communication lines comprise high speed digital transmission lines characterized by transmission rates on the order of tens or hundreds of megabits per second (Mbps).

38. A method of providing access to a plurality of communication lines by one or more testing devices, comprising:
  selecting one of the plurality of communication lines;
  selecting-one of a plurality of testing device interface outputs;
  establishing a signal conductivity path between the selected communication line and the selected testing device interface output, the signal conductivity path having a stripline configuration and being established on or in a printed circuit board having multiple layers and exhibiting characteristics of an unbalanced transmission line having a characteristic impedance approximately equivalent to an impedance of the selected communication line; and providing an information signal transmitted through the selected communication line to the selected testing device interface output for access by a testing device coupled to the selected testing device interface output.

39. The method of claim 38, wherein establishing the signal conductivity path further comprises activating one or more relays that selectively couple and decouple one of the plurality of communication lines with the selected testing device interface output.

40. The method of claim 38, wherein providing the information signal further comprises selectively providing the information signal to the selected testing device interface output or looping back the information signal to the selected communication line.

41. The method of claim 38, further comprising visually indicating a status of the selected communication line or the testing device coupled to the selected test device interface output.

42. The method of claim 38, wherein selecting one of the plurality of communication lines further comprises remotely selecting one of the plurality of communication lines.

43. The method of claim 38, wherein selecting one of the plurality of testing device interface outputs further comprises remotely selecting one of the plurality of testing device interface outputs.

* * * * *